Apr. 3, 1923.
E. F. STEMMLER
TIMBER TREATING APPARATUS
Filed Jan. 15, 1921
1,450,897
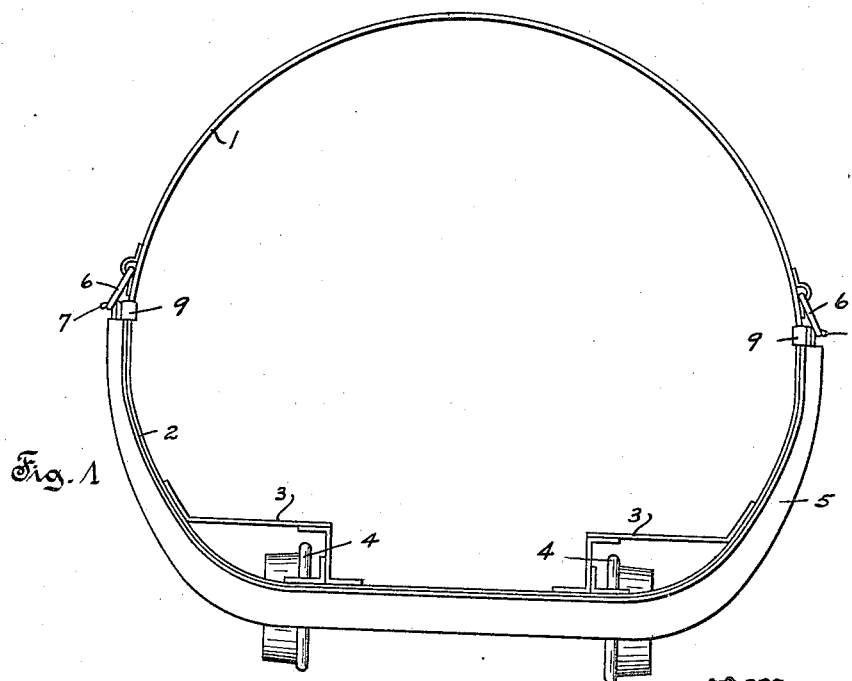
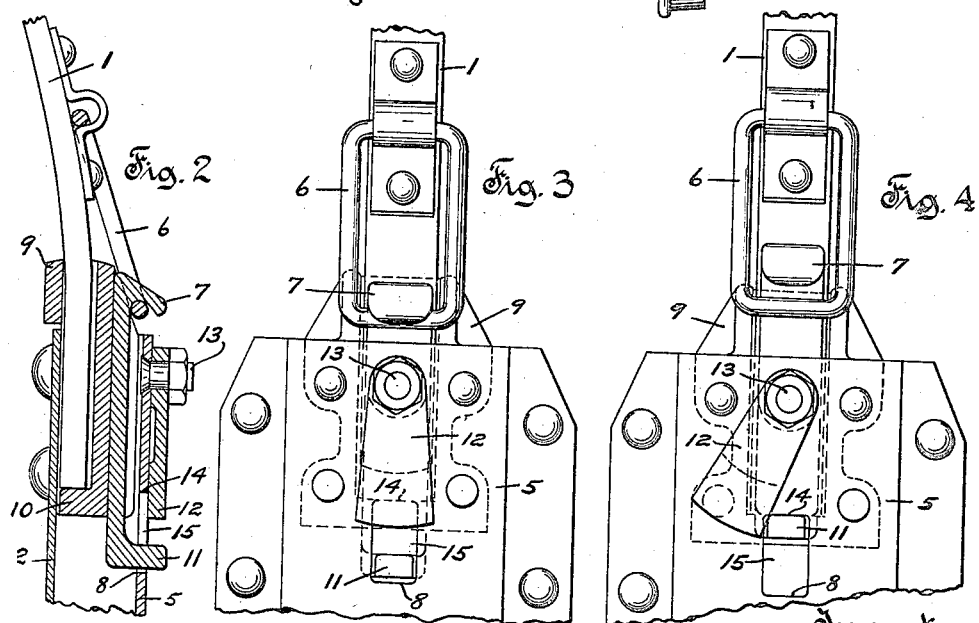

Patented Apr. 3, 1923.

1,450,897

UNITED STATES PATENT OFFICE.

EDWIN F. STEMMLER, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

TIMBER-TREATING APPARATUS.

Application filed January 15, 1921. Serial No. 437,433.

*To all whom it may concern:*

Be it known that EDWIN F. STEMMLER, a citizen of the United States, residing at Milwaukee, in the county of Milwaukee and State of Wisconsin, has invented a certain new and useful Timber-Treating Apparatus, of which the following is a specification.

This invention relates in general to improvements in the art of treating timber in order to preserve the same, and relates more specifically to improvements in the construction of piling or tie cars for transporting the timber into and from the treating cylinders.

An object of the invention is to provide a timber treating car structure which is simple, compact and efficient. Another object of the invention is to provide simple and efficient means for effecting rapid connection and removal of the bails to and from the body of a timber treating car. A further object of the invention is to generally improve the bail attachment means disclosed in Patent Number 1,109,334, granted September 1, 1914.

A clear conception of an embodiment of the invention and of the operation of a device constructed in accordance therewith, may be had by referring to the drawing accompanying and forming a part of this specification, in which like reference characters designate the same or similar parts in the several views.

Fig. 1 is an end view of a timber treating car, showing a bail attached to the bail arms by means of the improved attaching device.

Fig. 2 is an enlarged central vertical section through one of the bail attaching devices, showing the bail in its lowermost position.

Fig. 3 is an enlarged side view of one of the bail attaching devices, showing the bail in its lowermost position.

Fig. 4 is an enlarged side view of one of the bail attaching devices, showing the bail elevated a definite distance and showing the locking hook raised to its highest position.

The timber treating or tie car comprises in general a sheet metal body supported by wheels 4 and provided with upwardly extending side projections or bail arms 2 which cooperate with the bails 1 to retain the timber in place upon the car, see Fig. 1. The bail arms 2 are ordinarily formed of metal plates which are reinforced by means of channel members 5 riveted or welded to the plates. Wheel guards 3 secured to the bail arms 2 and to the car body, prevent the timber from engaging the wheels 4. The bails 1 are ordinarily constructed of rectangular sectional bar metal bent into semi-circular shape in order to permit the car to be positioned within a cylindrical treating tank, after it has been loaded.

The attaching means for securing the lower ends of the bails 1 to the upper extremities of the bail arms 2, are formed to permit rapid attachment and release of the bails 1. As disclosed in Figs. 2 to 4 inclusive, each of these attaching devices comprises a bail supporting member 9 rigidly secured to an end of a bail arm 2, a hook 7 slidably associated with the bail arm end, and a link 6 swingably mounted upon the adjacent bail end and cooperable with the hook 7 to lock the bail 1 to the adjacent bail arm 2. The bail supporting member 9 may be formed of cast metal and is provided at its lower end with a projection or lug 10 upon which the lower adjacent end of the bail 1 normally rests as shown in Figs. 2 and 3. The hook 7 is vertically slidable in a recess formed in the adjacent bail supporting member 9 and has an outwardly extending lower projection 11 which passes through an elongated opening 15 in the channel member 5. The lower and upper ends of the opening 15 form abutments 8, 14 respectively for limiting the vertical movement of the hook 7. The upper extremity of the hook 7 is provided with an outwardly extending curved projection forming a hook adapted to engage the link 6 which is pivotally associated with the adjacent end of the bail 1. A plate 12 is secured to the channel member 5 above the opening 15 therein, by means of a pivot 13, this plate being normally held in vertical position by gravity, and having a lower portion which overlaps the upper portion of the opening 15. The projection 11 of the hook 7 is of sufficient length so that it may engage the lower end of the plate 12 when the latter is vertically disposed, the plate 12 thus forming a stop for limiting vertical movement of the hook 7. With the plate 12 swung aside as shown in Fig. 4, the hook 7 may however be elevated until its projection 11 engages the abutment 14.

When a car is fully loaded with untreated timber, the ends of the bails 1 may be inserted within the openings afforded by the members 9 and bail arms 2, and the hooks 7 brought into engagement with the links 6 as shown in Figs. 2 and 3. In order to remove a bail 1 with the elements thus positioned, it is necessary only to raise the hooks 7 until they engage the lower ends of the adjacent pivoted plates 12, to subsequently swing the links 6 clear of the hooks 7, to subsequently permit the hooks 7 to drop against their lower stopping abutments 8, and to finally permit the links 6 to swing against the outer upper surfaces of the hook ends. The bail 1 is thus released and may then be freely vertically removed.

It often occurs that during treatment of the timber, the logs or ties adjust themselves or expand, thus causing them to move the bails 1 away from the car. With the plates 12 positioned as shown in Figs. 2 and 3, upward movement of the bail will be arrested when the projections 11 of the hooks 7 engage the lower surfaces of the plates 12. In order to effect release of the bail with the hooks 7 thus elevated, it is necessary to provide for additional vertical displacement of the hooks 7. Such additional clearance may be provided by swinging the plates 12 out of the path of travel of the hook projections 11, as shown in Fig. 4. The hooks 7 may then be raised until the projections 11 engage the upper abutments 14 whereupon the links 6 may again be swung clear of the hooks 7 and the bail 1 subsequently removed as previously described.

From the foregoing description it will be obvious that the bails 1 may be rapidly attached to and removed from the bail arms 2 with the aid of relatively simple and inexpensive mechanism. The car is safe-guarded against damage due to expansion of the timber treated thereon, by the provision of the clearance spaces between the projections 11 and the lower ends of the plates 12, while the plates 12 when swung aside permit release of the bail after such expansion of the timber has occurred.

It should be understood that it is not desired to limit the invention to the exact details of construction herein shown and described, for obvious modifications within the scope of the appended claims may occur to persons skilled in the art.

It is claimed and desired to secure by Letters Patent:

1. In a timber treating car, a bail arm member, a bail member, a link pivotally connected to one of said members, a hook slidably supported in the other of said members and engageable with said link to connect said members, and means associated with one of said members for positively limiting the extent of sliding of said hook to two extreme and an intermediate position.

2. In a timber treating car, a bail arm, a bail, a link pivotally connected to said bail, a hook slidably supported in said bail arm and engageable with said link to connect said bail and bail arm, and means associated with said bail arm for positively limiting the extent of sliding of said hook to two extreme and an intermediate position.

3. In a timber treating car, a bail arm, a bail, a link pivotally connected to said bail, a hook slidably supported in said bail arm and engageable with said link to connect said bail and bail arm, and a plate pivotally connected to said bail arm and engageable with said hook to limit the sliding movement of said hook.

4. In a timber treating car, a bail arm member, a bail member, a hook slidably supported in one of said members and engageable with the other of said members to lock said members together, means normally permitting only a definite amount of relative movement of said members longitudinally of said hook, and an adjustable stop for permitting additional relative positively limited movement of said members.

5. In a timber treating car, a bail arm member, a bail member, a hook slidably supported in one of said members, a link pivotally connected with the other of said members and adapted for coaction with said hook to lock said members together, means normally permitting only a definite amount of movement of said hook and link longitudinally of said members, and movable means for permitting additional relative positively limited movement of said hook and link longitudinally of said members.

6. In a timber treating car, a bail arm, a bail, a hook slidably supported in said bail arm and engageable with said bail to lock said bail to said bail arm, said bail arm being formed to normally permit a definite amount of relative movement of said hook longitudinally of said bail arm, and a pivoted plate for permitting additional movement of said hook.

7. In a timber treating car, a bail arm, a bail, a hook slidably supported in said bail arm, a link pivotally connected with said bail and adapted for coaction with said hook to lock said bail to said bail arm, means normally permitting a definite amount of movement, of said hook longitudinally of said bail arm, and a pivoted plate for permitting additional movement of said hook.

8. In a timber treating car, a bail arm, a bail, a link secured to said bail, said bail arm having definitely spaced stops thereon, a hook freely movable between said stops and detachably connected with said link, and a plate pivoted to said bail arm for varying the distance between said stops.

In testimony whereof, the signature of the inventor is affixed hereto.

EDWIN F. STEMMLER.